(12) United States Patent
Kawai

(10) Patent No.: US 10,951,873 B2
(45) Date of Patent: Mar. 16, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takashi Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/532,340

(22) Filed: Aug. 5, 2019

(65) Prior Publication Data

US 2020/0053336 A1    Feb. 13, 2020

(30) Foreign Application Priority Data

Aug. 8, 2018  (JP) .............................. JP2018-149435

(51) Int. Cl.
| | |
|---|---|
| *H04N 13/117* | (2018.01) |
| *H04N 5/247* | (2006.01) |
| *H04N 13/167* | (2018.01) |
| *H04N 21/2543* | (2011.01) |
| *H04N 21/218* | (2011.01) |

(52) U.S. Cl.
CPC .......... *H04N 13/117* (2018.05); *H04N 5/247* (2013.01); *H04N 13/167* (2018.05); *H04N 21/21805* (2013.01); *H04N 21/2543* (2013.01)

(58) Field of Classification Search
None
See application file for complete search history.

(56) References Cited

U.S. PATENT DOCUMENTS

| | | | |
|---|---|---|---|
| 2017/0188058 A1* | 6/2017 | Nakashima | ........ H04N 21/2543 |
| 2019/0253743 A1* | 8/2019 | Tanaka | ................. H04N 21/812 |
| 2020/0027261 A1* | 1/2020 | Briggs | ................. H04N 13/383 |

FOREIGN PATENT DOCUMENTS

JP         2014-215828 A        11/2014

* cited by examiner

*Primary Examiner* — Talha M Nawaz
(74) *Attorney, Agent, or Firm* — Canon U.S.A., Inc. IP Division

(57) ABSTRACT

An information processing apparatus includes an obtaining unit configured to obtain viewpoint information indicating at least a position of a virtual viewpoint corresponding to a virtual viewpoint image that is generated based on a plurality of images obtained by a plurality of image capturing apparatuses each capturing an image of an imaging target area in a different direction, and an output unit configured to output a value of the virtual viewpoint image corresponding to the position of the virtual viewpoint indicated by the viewpoint information obtained by the obtaining unit, wherein the value is determined based on the viewpoint information.

19 Claims, 10 Drawing Sheets

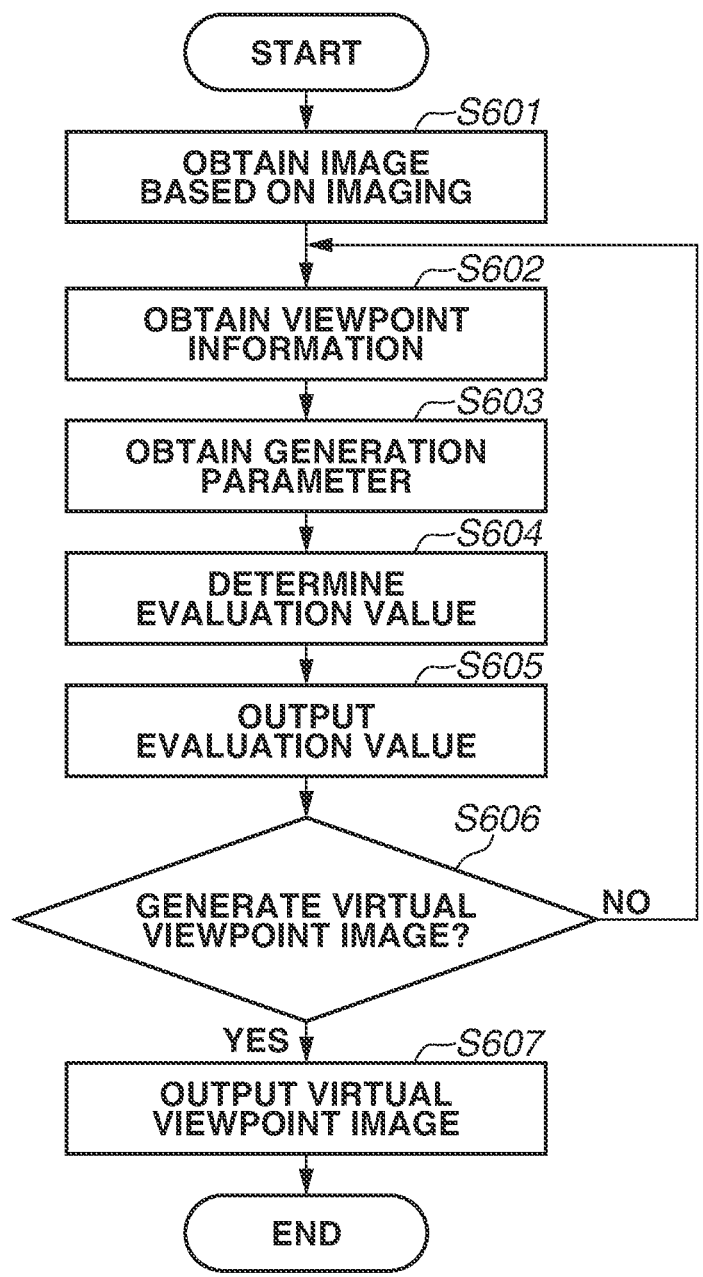

FIG.7A

| VIEWPOINT HEIGHT (cm) | CHARGE PER UNIT TIME (YEN/SEC) |
|---|---|
| 0 – 200 | 0 |
| 200 – 300 | 1,000 |
| 300 – 500 | 3,000 |
| 500 – | 5,000 |

FIG.7B

| OBJECT DISTANCE (cm) | CHARGE PER UNIT TIME (YEN/SEC) |
|---|---|
| 0 – 40 | 10,000 |
| 40 – 60 | 8,000 |
| 60 – 80 | 6,000 |
| 80 – 100 | 4,000 |
| 100 – 150 | 2,000 |
| 150 – 300 | 1,000 |
| 300 – | 0 |

FIG.7C

| OBJECT | CHARGE PER UNIT TIME (YEN/SEC) |
|---|---|
| PLAYER A | 50,000 |
| PLAYER B | 30,000 |
| PLAYER C | 28,000 |
| PLAYER D | 30,000 |
| PLAYER E | 20,000 |
| PLAYER F | 18,000 |
| PLAYER G | 15,000 |

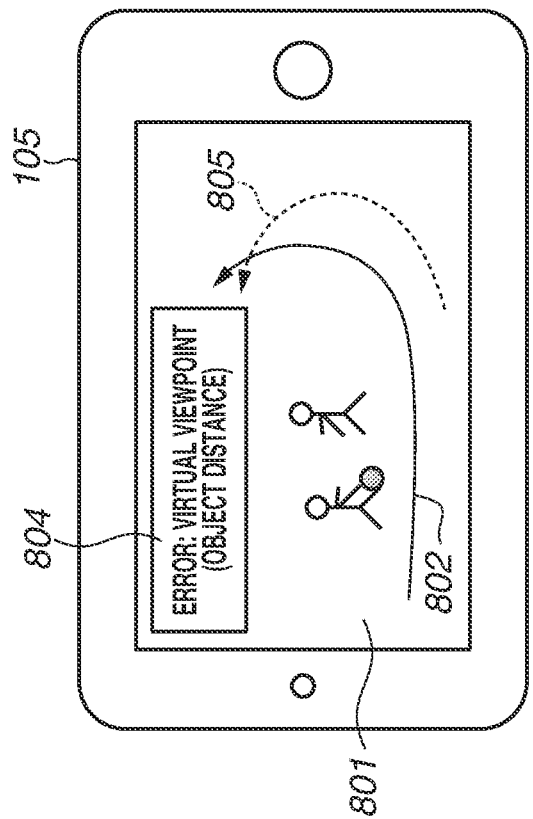
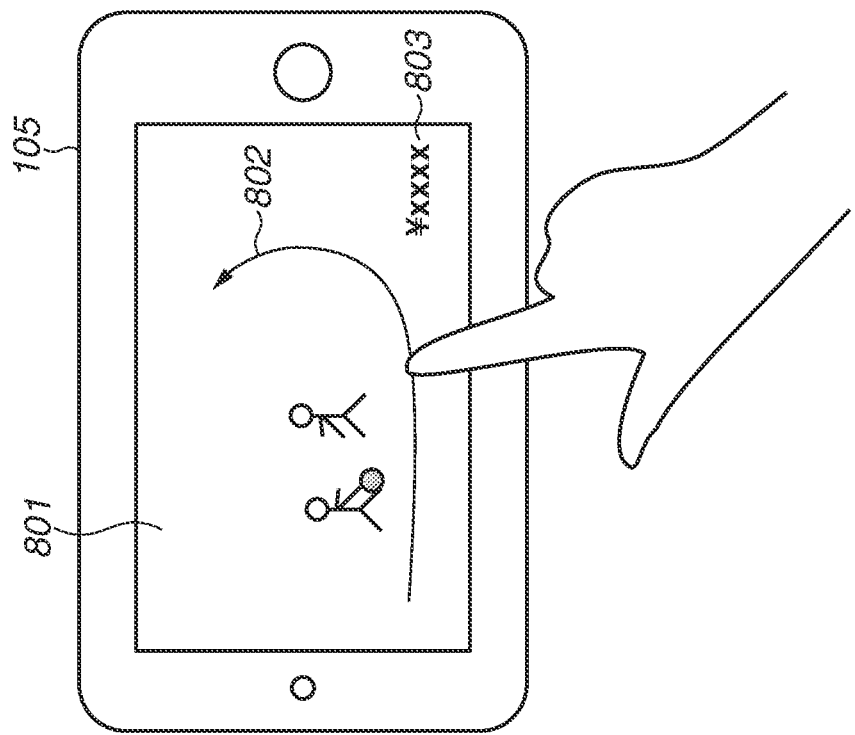

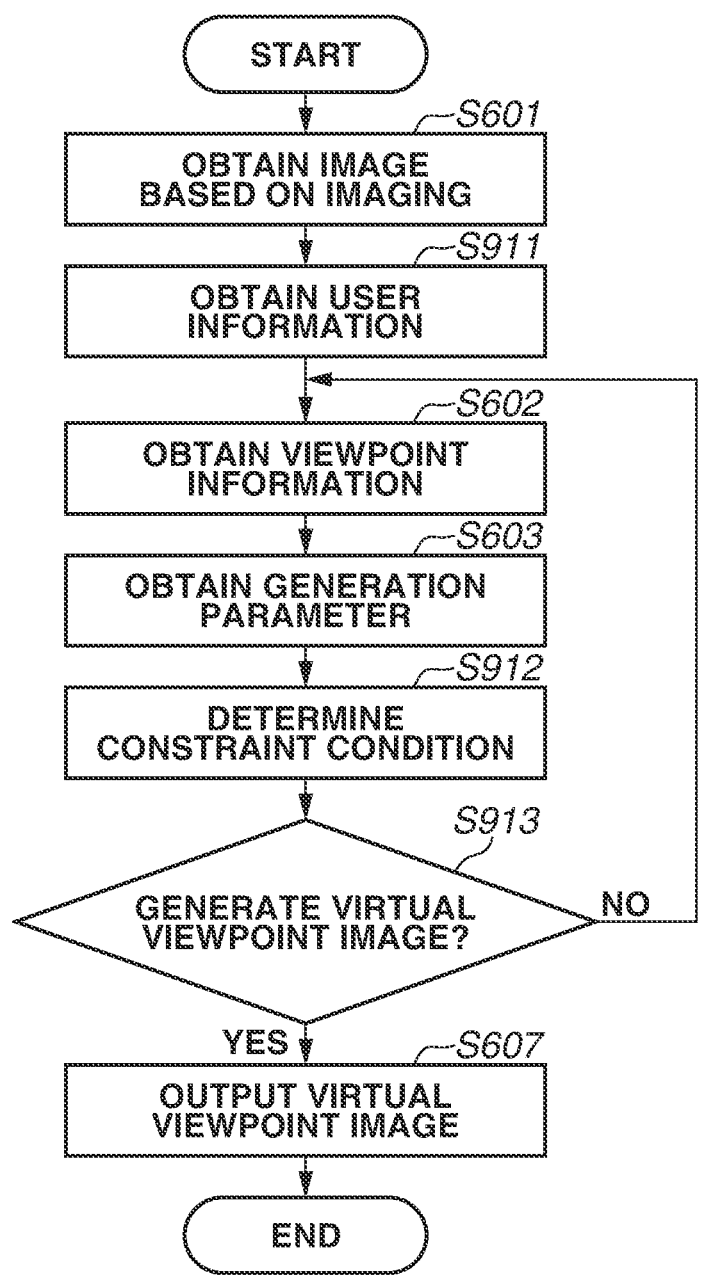

FIG.10A

| VIEWPOINT HEIGHT (cm) | PERMITTED USER |
|---|---|
| 0 – 200 | A, B, C, D |
| 200 – 300 | A, B, C |
| 300 – 500 | A, B |
| 500 – | A |

FIG.10B

| OBJECT DISTANCE (cm) | PERMITTED USER |
|---|---|
| 0 – 40 | A |
| 40 – 100 | A, B |
| 100 – 300 | A, B, C |
| 300 – | A, B, C, D |

FIG.10C

| OBJECT | PERMITTED USER |
|---|---|
| PERSON W | A |
| PERSON X | A, B |
| PERSON Y | A, C |
| PERSON Z | A, B, C, D |

INFORMATION PROCESSING APPARATUS, INFORMATION PROCESSING METHOD, AND STORAGE MEDIUM

BACKGROUND

Field of the Disclosure

The present disclosure relates to a virtual viewpoint image that is generated based on a plurality of captured images obtained by a plurality of image capturing apparatuses.

Description of the Related Art

There is a technique for generating a virtual viewpoint image using a plurality of images synchronously captured from multiple viewpoints by a plurality of imaging apparatuses (cameras) installed at different positions, and a viewpoint of the virtual viewpoint image can be arbitrarily changed. For example, the virtual viewpoint image corresponding to a viewpoint set by a user is generated based on images that have captured a sporting event such as soccer and basketball, and thus the user can watch the event from various angles. Displaying the above-described virtual viewpoint image can provide a viewer with a higher realistic sensation compared with a case in which a normally captured image is displayed.

Japanese Patent Application Laid-Open No. 2014-215828 describes a technique for providing each of a plurality of users with a virtual viewpoint image corresponding to a virtual viewpoint specified by the user and enabling the plurality of users to share the specified virtual viewpoint.

However, in a system that provides a virtual viewpoint image, it may not be appropriate to handle different users or different virtual viewpoint images uniformly in some cases. For example, if a large number of users make requests to generate virtual viewpoint images exceeding a processing capability of the system, and the system tries to uniformly process all the requests, there is a possibility that processing cannot be completed for any of the requests. Further, for example, in a case where a cost of generation is different depending on content of a virtual viewpoint image, and if the cost is uniformly charged to the users who request generation of the virtual viewpoint images, there is a possibility that the cost cannot be appropriately recovered.

SUMMARY

According to an aspect of the present disclosure, an information processing apparatus includes an obtaining unit configured to obtain viewpoint information indicating at least a position of a virtual viewpoint corresponding to a virtual viewpoint image that is generated based on a plurality of images obtained by a plurality of image capturing apparatuses each capturing an image of an imaging target area in a different direction, and an output unit configured to output a value of the virtual viewpoint image corresponding to the position of the virtual viewpoint indicated by the viewpoint information obtained by the obtaining unit, wherein the value is determined based on the viewpoint information.

Further features of the present disclosure will become apparent from the following description of exemplary embodiments with reference to the attached drawings.

BRIEF DESCRIPTION OF THE DRAWINGS

FIG. 6 is a flowchart illustrating operations of the information processing apparatus.

FIGS. 7A to 7C are tables illustrating examples of reference information about evaluation values.

FIGS. 8A and 8B are diagrams each illustrating an image displayed on a display unit.

FIG. 9 is a flowchart illustrating operations of the information processing apparatus.

FIGS. 10A to 10C are tables illustrating examples of reference information about constraints.

DESCRIPTION OF THE EMBODIMENTS

Various exemplary embodiments of the present disclosure will be described in details below with reference to the attached drawings. However, the present disclosure is not limited to the exemplary embodiments described below and can be modified and altered in various ways within the scope and the gist of the present disclosure.

[Configuration of Image Processing System]

Figure 1:
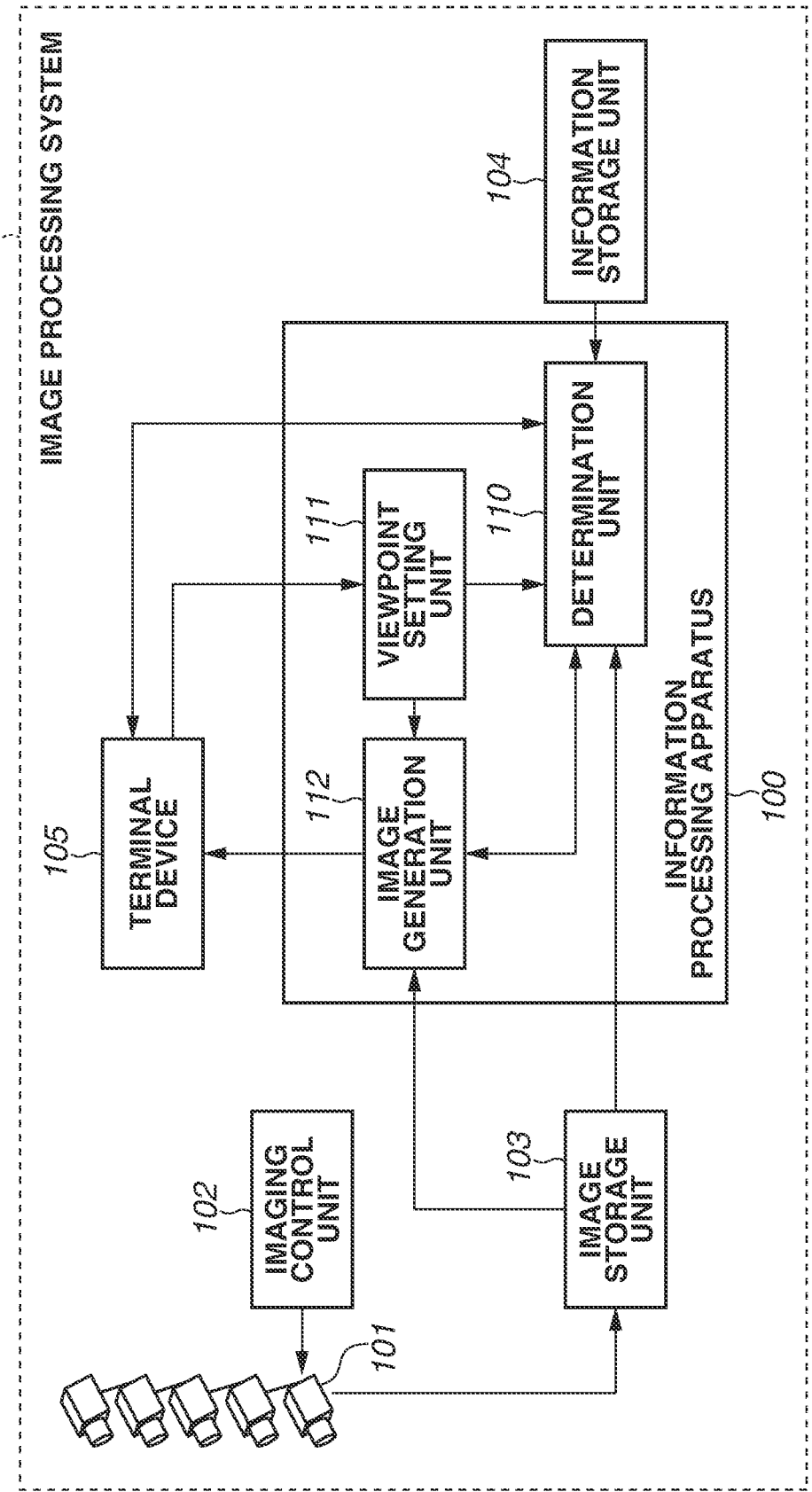
FIG. 1 is a block diagram illustrating an example of a configuration of an image processing system.

FIG. 1 is a block diagram illustrating an example of a configuration of an image processing system 10 according to the present exemplary embodiment. The image processing system 10 is a system that generates a virtual viewpoint image representing a view from a specified virtual viewpoint based on images captured by a plurality of imaging apparatuses (image capturing apparatuses) and the specified virtual viewpoint. The virtual viewpoint image according to the present exemplary embodiment is also referred to as a free viewpoint video. The virtual viewpoint image is not only limited to an image corresponding to a viewpoint freely (arbitrarily) specified by a user but also includes an image corresponding to a viewpoint selected by a user from among a plurality of candidates. In the present exemplary embodiment, a case in which the virtual viewpoint is specified by a user operation is mainly described; however, the virtual viewpoint may also be automatically specified by the image processing system 10 based on a result of image analysis and the like. Further, in the present exemplary embodiment, a case in which the virtual viewpoint image is a moving image is mainly described; however, the virtual viewpoint image to be processed by the image processing system 10 may also be a still image.

The image processing system 10 includes an information processing apparatus 100, a camera group 101, an imaging control unit 102, an image storage unit 103, an information storage unit 104, and a terminal device 105. FIG. 1 illustrates a case in which a single terminal device 105 is connected to the information processing apparatus 100 as an example. Alternatively, a plurality of the terminal devices 105 may be connected to the information processing apparatus 100.

Figure 2:
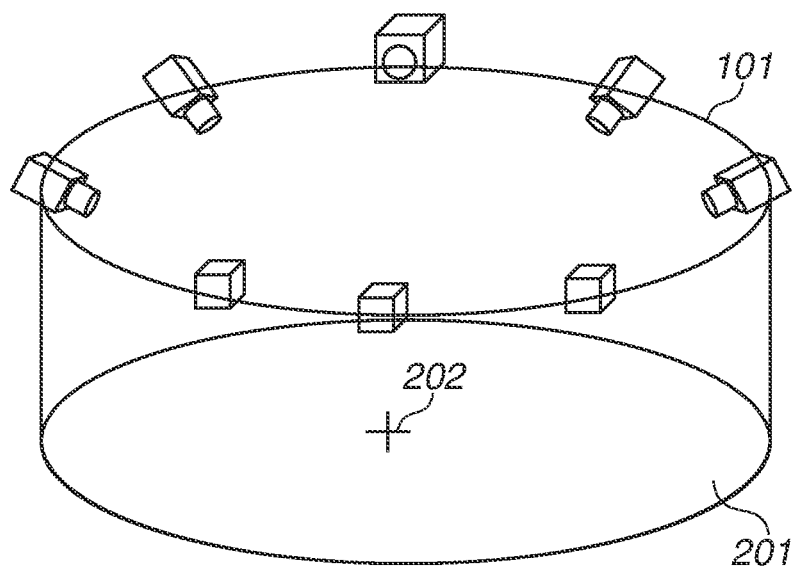
FIG. 2 is a diagram illustrating an example of installation of a camera group.

The camera group 101 includes a plurality of cameras that captures images of an imaging target area from a plurality of directions. The imaging target area is, for example, a stadium in which sporting events such as soccer and karate are played or a stage on which a concert or a theatrical play is performed. The plurality of cameras included in the camera group 101 is installed at different positions so as to surround the imaging target area and synchronously performs imaging. FIG. 2 is a diagram illustrating an example of installation of the camera group 101. In this example, all of the plurality of cameras included in the camera group 101 installed around an imaging target area 201 is directed toward a gaze point 202. The camera group 101 does not have to be installed in a whole circumference of the imaging target area. Alternatively, the camera group 101 may be installed only in part of the circumference of the imaging target area depending on a restriction on an installation location.

Figure 3:
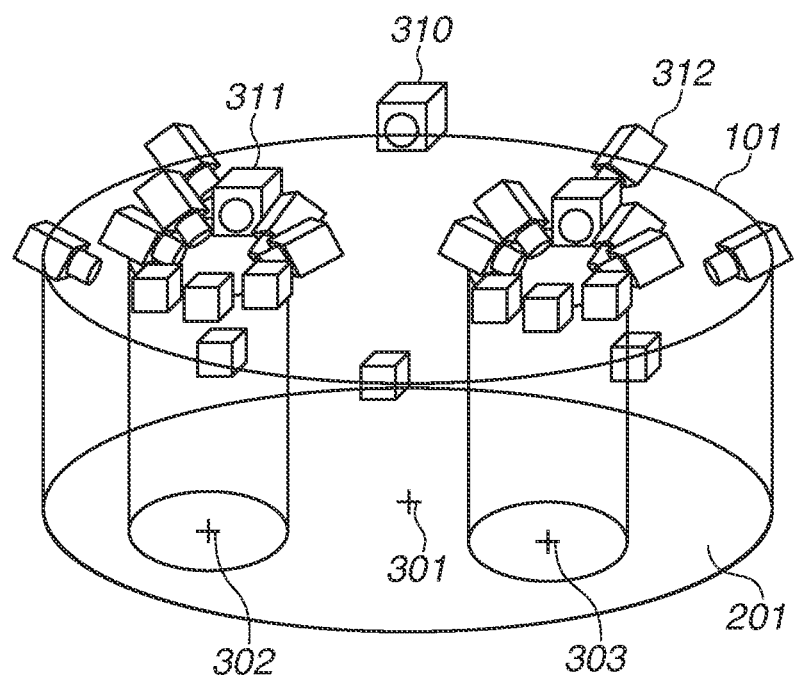
FIG. 3 is a diagram illustrating an example of installation of camera groups.

In addition, not all of the plurality of cameras included in the camera group 101 may be directed toward the single gaze point 202. For example, the camera group 101 may include a group of cameras directed toward one gaze point and a group of cameras directed toward another gaze point. Further, the camera group 101 may include cameras having different functions such as a telephotographic camera and a wide-angle camera. FIG. 3 is a diagram illustrating an example of installation of the camera group 101 in a case where a plurality of gaze points is set. The camera group 101 includes a group 310 of cameras directed toward a gaze point 301, a group 311 of cameras directed toward a gaze point 302, and a group 312 of cameras directed toward a gaze point 303. The cameras belonging to the group 311 are densely installed closer to the gaze point 302 than the cameras belonging to the group 310 and thus can capture images in the vicinity of the gaze point 302 with high resolution. Similarly, the cameras belonging to the group 312 can capture images in the vicinity of the gaze point 303 with high resolution. On the other hand, the cameras belonging to the group 310 are spaciously installed around the imaging target area 201 and can capture images of a wide area centering on the gaze point 301.

The imaging control unit 102 issues an instruction to set an imaging condition and an instruction to start and to end imaging with respect to the camera group 101. For example, the imaging control unit 102 specifies an Internet Protocol (IP) address assigned to each camera and issues an instruction to set a shutter speed, an aperture value, a focal length, and the like as the imaging condition.

The image storage unit 103 stores images (multi-viewpoint images) based on synchronous imaging in a plurality of directions by the camera group 101 in a storage medium such as a hard disk drive, a solid state disk (SSD), and a secure digital (SD) card. In the present exemplary embodiment, the image based on the imaging that is stored in the image storage unit 103 includes a texture image for coloring a foreground model representing a three-dimensional shape of a predetermined object included in the captured image and a background model representing a three-dimensional shape of a background such as a stadium. However, the image based on the imaging that is stored in the image storage unit 103 is not limited to the above-described one and may also be a plurality of captured images as they are or another image that is obtained by performing image processing on the plurality of captured images. For example, a foreground image that is obtained by extracting an area corresponding to a predetermined object such as a person and a ball included in the captured image, and a background image that is obtained by excluding the foreground image front the captured image may be stored in the image storage unit 103. The image storage unit 103 may store an IP address for identifying each camera included in the camera group 101 and imaging information indicating an operation state and an imaging condition of each camera at a time of imaging, together with the image based on the imaging.

The information storage unit 104 stores reference information used by the information processing apparatus 100 to determine an evaluation value (value) of the virtual viewpoint image in a storage medium such as a hard disk drive, a SSD, and a SD card. The reference information is described in detail below with reference to FIGS. 7A to 7C. The reference information stored by the information storage unit 104 is input from the information processing apparatus 100 to the information storage unit 104 and is stored therein. However, the reference information is not limited to the above-described one and may also be input from another apparatus to the information storage unit 104 and may be manually input by a user operating an operation unit of the information storage unit 104.

The terminal device 105 includes an operation unit such as a joy stick, a button, and a touch panel and receives an operation regarding generation of the virtual viewpoint image by the user. The terminal device 105 outputs instruction information corresponding to a user operation and user information for identifying the user to the information processing apparatus 100. Further, the terminal device 105 displays the virtual viewpoint image output from the information processing apparatus 100 in response to the instruction information to the user via a display unit. The operation regarding generation of the virtual viewpoint image by the user includes, for example, an operation to instruct a start of generation of the virtual viewpoint image, an operation to specify a reproduction mode of a virtual viewpoint, and an operation to specify a position and a direction of the virtual viewpoint. In other words, the instruction information corresponding to the user operation includes information for controlling the position and the direction of the virtual viewpoint. Further, the operation regarding generation of the virtual viewpoint image by the user may also be an operation to specify a camera to be used for generation of the virtual viewpoint image from among the cameras included in the camera group 101. In other words, the information processing apparatus 100 may generate the virtual viewpoint image using only images based on imaging by part of the cameras (for example, the cameras belonging to the group 311 in FIG. 3) in response to a specifying operation by the user.

Figure 4:
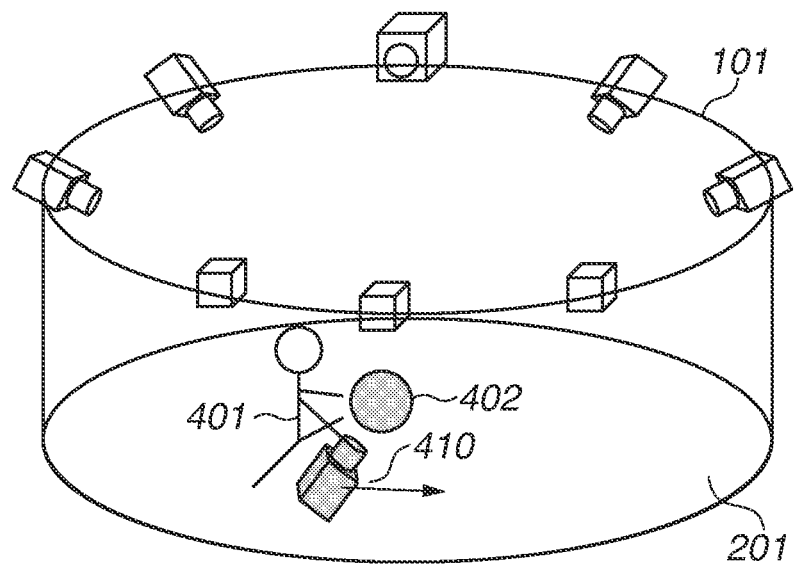
FIG. 4 is a diagram illustrating a setting of a virtual viewpoint.

It is not necessary for the user to strictly specify the virtual viewpoint for an entire period of the virtual viewpoint image that the user wants to view. For example, the terminal device 105 may output instruction information corresponding to various user instructions representing a desire to view an image focusing on a specific singer or a specific player, a desire to view an image in a certain range around a specific object, and a desire to view an image of a spot where a notable event occurs. In a case where a player 401 and a ball 402 are located as objects in the imaging target area 201 as illustrated in FIG. 4, the user may directly operate a virtual viewpoint 410 or may semi-automatically operate the virtual viewpoint 410 by specifying the player 401 and the ball 402. In addition, the user may select a virtual viewpoint to be used from among a plurality of virtual viewpoints that are automatically set.

The terminal device 105 notifies a user of an evaluation value of the virtual viewpoint image obtained from the information processing apparatus 100 by audio output using a loudspeaker and image display using the display unit. In the present exemplary embodiment, a case is mainly described in which a price of the virtual viewpoint image (charge for using the virtual viewpoint image) is output as the evaluation value of the virtual viewpoint image. For example, the terminal device 105 notifies the user of the price of the virtual viewpoint image generated by the information processing apparatus 100 in response to a user operation to specify the virtual viewpoint. If the user performs an operation to accept purchase of the virtual viewpoint image at the price, the terminal device 105 obtains the generated virtual viewpoint image from the information processing apparatus 100 and displays the virtual viewpoint image. However, content of the evaluation value is not limited to the above-described one and may also be a point for using the virtual viewpoint image. Alternatively, for example, the information processing apparatus 100 may output an evaluation value indicating a quality of the virtual viewpoint image and an evaluation value corresponding to a period in which a specific person or a specific event is captured in the virtual viewpoint image and how the person or the event is captured therein.

The information processing apparatus 100 includes a determination unit 110, a viewpoint setting unit 111, and an image generation unit 112. The determination unit 110 obtains a generation parameter related to generation of the virtual viewpoint image from each of the image storage unit 103, the viewpoint setting unit 111, and the terminal device 105 and determines the evaluation value of the virtual viewpoint image to be generated based on the generation parameter and the reference information obtained from the information storage unit 104. The determination unit 110 outputs the determined evaluation value to the terminal device 105. A method for determining the evaluation value is described in detail below with reference to FIG. 4 and others. The determination unit 110 determines whether to generate the virtual viewpoint image based on the instruction information obtained from the terminal device 105 and instructs the image generation unit 112 to generate the virtual viewpoint image depending on the determination result.

The viewpoint setting unit 111 sets the virtual viewpoint related to generation of the virtual viewpoint image based on the instruction information obtained from the terminal device 105. The viewpoint setting unit 111 outputs viewpoint information indicating the set virtual viewpoint to the determination unit 110 and the image generation unit 112. More specifically, the viewpoint information includes time information indicating a generation target period of the virtual viewpoint image included in an imaging period by the camera group 101 and information about the position and the direction of the virtual viewpoint at each point of time in the generation target period. Further, the viewpoint information may include information about an angle of view, a focal length, and a focal position of the virtual viewpoint.

The image generation unit 112 generates the virtual viewpoint image corresponding to the position and the direction of the virtual viewpoint indicated by the viewpoint information based on the image based on the imaging obtained from the image storage unit 103, the viewpoint information obtained from the viewpoint setting unit 111, and a generation instruction obtained from the determination unit 110. The image generation unit 112 outputs the generated virtual viewpoint image to the terminal device 105. A generation method for the virtual viewpoint image includes, for example, the following method. First, the image generation unit 112 generates a foreground model representing a three-dimensional shape of a predetermined object in the imaging target area 201 based on a multi-viewpoint image obtained from the image storage unit 103. Subsequently, the image generation unit 112 generates the virtual viewpoint image by mapping a texture image corresponding to the viewpoint information obtained from the viewpoint setting unit 111 to the generated foreground model and the background model obtained from the image storage unit 103 and by performing rendering thereon. However, the generation method for the virtual viewpoint image is not limited to the above-described one, and various methods such as a method for generating a virtual viewpoint image by performing projective transformation on an image based on the imaging without using a three-dimensional model can also be used.

The configuration of the image processing system 10 is not limited to the one illustrated in FIG. 1. For example, the information storage unit 104 and the image storage unit 103 may be included inside the information processing apparatus 100. In addition, the image generation unit 112 and the viewpoint setting unit 111 may be included inside another apparatus different from the information processing apparatus 100.

[Configuration of Information Processing Apparatus]

Figure 5:
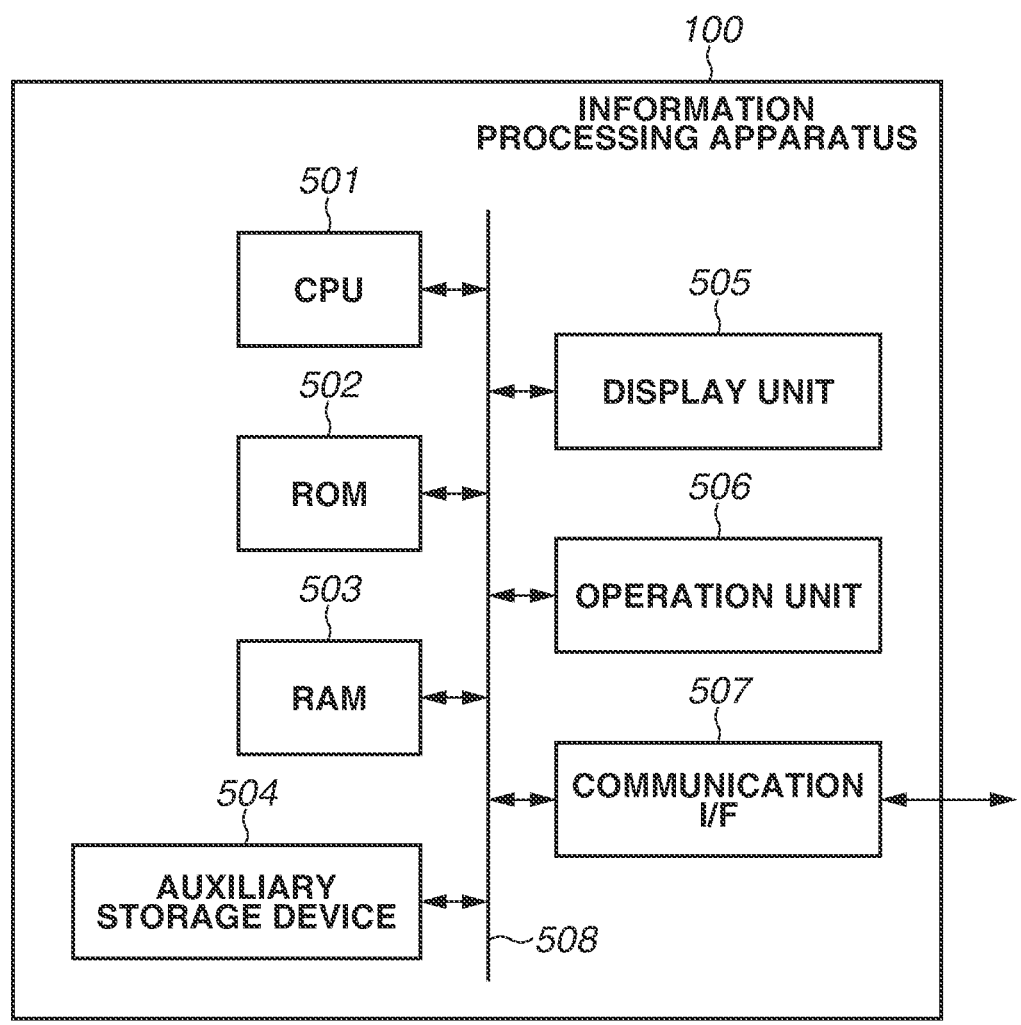
FIG. 5 is a block diagram illustrating an example of a hardware configuration of an information processing apparatus.

Next, a hardware configuration of the information processing apparatus 100 is described with reference to FIG. 5. The information processing apparatus 100 includes a central processing unit (CPU) 501, a read-only memory (ROM) 502, a random access memory (RAM) 503, an auxiliary storage device 504, a display unit 505, an operation unit 506, a communication interface (I/F) 507, and a bus 508.

The CPU 501 controls the entire information processing apparatus 100 using a computer program and data stored in the ROM 502 and the RAM 503 to implement each functional component in the information processing apparatus 100 illustrated in FIG. 1. The information processing apparatus 100 may include one or a plurality of dedicated hardware components different from the CPU 501, and the dedicated hardware component may execute at least a part of processing executed by the CPU 501. Examples of the dedicated hardware component include an application specific integrated circuit (ASIC), a field-programmable gate array (FPGA), and a digital signal processor (DSP). The ROM 502 stores a program and a parameter that do not need to be changed. The RAM 503 temporarily stores a program and data supplied from the auxiliary storage device 504 and data externally supplied via the communication a 507. The auxiliary storage device 504 includes, for example, a hard disk drive and stores various pieces of data such as image data, audio data, and virtual camera path information.

The display unit 505 includes, for example, a liquid crystal display and a light emitting diode (LED) and displays a graphical user interface (GUI) enabling the user to operate the information processing apparatus 100. The operation unit 506 includes, for example, a keyboard, a mouse, and a touch panel. Upon receiving an operation performed by the user, the operation unit 506 inputs various instructions to the CPU 501. The communication I/F 507 is used for communicating with an external apparatus such as the terminal device 105. For example, in a case where the information processing apparatus 100 is connected with the external apparatus by a wired communication, a communication cable is connected to the communication I/F 507. In a case where the information processing apparatus 100 has a function to wirelessly communicate with the external apparatus, the communication I/F 507 includes an antenna. The bus 508 connects each of the components in the information processing apparatus 100 with each other to transmit information.

In the present exemplary embodiment, the display unit 505 and the operation unit 506 are included inside the information processing apparatus 100. Alternatively, the information processing apparatus 100 may not include at least one of the display unit 505 and the operation unit 506. At least one of the display unit 505 and the operation unit 506 may exist as a different apparatus outside the information processing apparatus 100, and the CPU 501 may function as a display control unit that controls the display unit 505 and an operation control unit that controls the operation unit 506.

[Processing Flow of Information Processing Apparatus]

A processing flow of the information processing apparatus 100 is described with reference to FIG. 6. The processing illustrated in FIG. 6 is started at a timing, for example, when the instruction information for starting generation of the virtual viewpoint image is input from the terminal device 105 to the information processing apparatus 100 after imaging by the camera group 101 is finished and an image based on the imaging is stored in the image storage unit 103. However, the instruction information may be input during the imaging by the camera group 101, and the processing illustrated in FIG. 6 may be executed in parallel with the imaging. Thus, a timing to start the processing illustrated in FIG. 6 is not limited to the above-described one. The processing illustrated in FIG. 6 is implemented by the CPU 501 loading a program stored in the ROM 502 to the RAM 503 and executing the loaded program. At least a part of the processing illustrated in FIG. 6 may be implemented by one or a plurality of dedicated hardware components different from the CPU 501. The same applies to processing in a flowchart illustrated in FIG. 9 described below.

In step S601, the image generation unit 112 obtains the images stored in the image storage unit 103, i.e., the images based on the imaging of the imaging target area 201 in a plurality of directions by the camera group 101. The image generation unit 112 may obtain the images based on the imaging in real time during the imaging by the camera group 101. In step S602, the viewpoint setting unit 111 obtains the viewpoint information indicating the virtual viewpoint based on the instruction information output from the terminal device 105. The viewpoint setting unit 111 outputs the obtained viewpoint information to the age generation unit 112. Obtainment of the image in step S601 and obtainment of the viewpoint information in step S602 may be performed in reverse order or in parallel.

In step S603, the determination unit 110 obtains setting information that is set based on a specifying operation by the user as a generation parameter related to generation of the virtual viewpoint image by the image generation unit 112 from the terminal device 105 and the viewpoint setting unit 111. However, the determination unit 110 may obtain the setting information stored in the image storage unit 103 as the generation parameter or may obtain the generation parameter by analyzing the image based on the imaging. The generation parameter obtained by the determination unit 110 includes, for example, the viewpoint information indicating at least one of the position and the direction of the virtual viewpoint. However, the generation parameter is not limited to the above-described one and may also include information about an image quality, information indicating a method for specifying the virtual viewpoint, information about the imaging apparatus corresponding to the image used for generating the virtual viewpoint image, and information indicating the reproduction mode.

The information indicating the method for specifying the virtual viewpoint refers to, for example, information about which mode to apply from among a mode of manually setting the position and the direction of the virtual viewpoint by the user, a mode of setting the virtual viewpoint by the user designating an object, and a mode of automatically setting the virtual viewpoint. The information about the imaging apparatus refers to, for example, the number of cameras, a type of the cameras, and the number of gaze points toward which the cameras are directed. The information indicating the reproduction mode of the virtual viewpoint image refers to, for example, a mode in which the virtual viewpoint can be changed during reproduction of a moving image, a mode in which the virtual viewpoint can be changed only during a pause of the moving image, and a mode of performing variable speed reproduction.

In step S604, the determination unit 110 determines the evaluation value of the virtual viewpoint image corresponding to the generation parameter obtained in step S603. More specifically, the determination unit 110 determines the evaluation value based on the reference information corresponding to the obtained generation parameter among pieces of the reference information stored in the information storage unit 104 in advance. FIGS. 7A to 7C illustrate examples of the reference information stored in the information storage unit 104. A case is described as an example in which a price of the virtual viewpoint image is determined as the evaluation value of the virtual viewpoint image based on the reference information indicating a relationship between the evaluation value and the position and the direction of the virtual viewpoint as the generation parameters.

The reference information illustrated in FIG. 7A associates a height of the position of the virtual viewpoint with an additional charge per unit time of the virtual viewpoint image. In this case, as the virtual viewpoint is set to a higher position, the evaluation value of the virtual viewpoint image becomes higher because the virtual viewpoint image at a viewpoint that is difficult to be achieved by an image captured by an actual camera can be obtained. The reference information illustrated in FIG. 7B associates a distance between the position of the virtual viewpoint and a specific object such as a player with the additional charge per unit time of the virtual viewpoint age. In this case, as the virtual viewpoint is set to a position closer to the player, the evaluation value of the virtual viewpoint image becomes higher because the virtual viewpoint image that is difficult to be achieved by an image captured by the actual camera having a limitation on a distance at which the camera can approach the player. The reference information illustrated in FIG. 7C associates an object included in a field of view of the virtual viewpoint (an object captured in the virtual viewpoint image) with the additional charge per unit time of the virtual viewpoint image. In this case, for example, as the field of view of the virtual viewpoint includes a more popular player many users want to watch, the evaluation value of the virtual viewpoint image becomes higher. As described above, the determination unit 110 determines the evaluation value based on at least any one of a period of time during which the virtual viewpoint corresponding to the generation parameter is positioned within a predetermined area, a distance between the virtual viewpoint and a specific object in the imaging target area 201, and an object included in the field of view of the virtual viewpoint.

A criterion for determining the evaluation value by the determination unit 110 is not limited to the above-described example. For example, the determination unit 110 may determine the evaluation value based on at least any one of a moving distance of the virtual viewpoint, a moving speed of the virtual viewpoint, and a setting period of the virtual viewpoint corresponding to the generation parameter. More specifically, the evaluation value may be set higher as a moving distance of the virtual viewpoint is longer, the evaluation value may be set higher as a moving speed is faster, and the evaluation value may be determined corresponding to an event that occurs in the imaging target area 201 during a setting period of the virtual viewpoint (target period in which the virtual viewpoint image is generated). Alternatively, the evaluation value may be simply set higher as the setting period of the virtual viewpoint is longer. A format of the reference information to be stored in the information storage unit 104 is not limited to the above-described one. More specifically, the reference information may include array information that associates the generation parameter with the evaluation value as tables illustrated in FIGS. 7A to 7C or may include, for example, a formula for calculating the evaluation value from the generation parameter.

In step S605, the determination unit 110 outputs the evaluation value determined in step S604 to the terminal device 105. The terminal device 105 notifies the user of the evaluation value obtained from the determination unit 110. FIG. 8A illustrates an example of an image displayed on a display unit 801 of the terminal device 105 in a case where the terminal device 105 notifies the user of the evaluation value by image display. An image of the imaging target area 201 captured by any of the cameras included in the camera group 101 is displayed on the display unit 801 of the terminal device 105. Alternatively, the displayed image may also be the virtual viewpoint image output from the information processing apparatus 100. On the display unit 801, a virtual camera path 802 representing a movement path of the virtual viewpoint specified by the user, and the evaluation value determined by the determination unit 110 of the information processing apparatus 100 based on the virtual camera path 802 are displayed.

After notifying the user of the evaluation value, the terminal device 105 receives a user operation regarding whether to accept the evaluation value. In a case where the operation to accept the evaluation value is received, the terminal device 105 outputs the instruction information for requesting generation of the virtual viewpoint image to the information processing apparatus 100. On the other hand, in a case where the evaluation value is not accepted, the terminal device 105 receives, from the user, an operation to specify information indicating a new virtual viewpoint or an operation to cancel generation of the virtual viewpoint image, and outputs the instruction information corresponding to the operation to the information processing apparatus 100.

In step S606, the determination unit 110 determines whether to generate the virtual viewpoint image based on the instruction information obtained from the terminal device 105 after outputting the evaluation value. In a case where the obtained instruction information indicates a request for generating the virtual viewpoint image, the determination unit 110 determines to generate the virtual viewpoint image (YES in step S606). In step S607, the image generation unit 112 generates the virtual viewpoint image corresponding to the generation parameter obtained in step S603 and outputs the generated virtual viewpoint image to the terminal device 105. Upon outputting the virtual viewpoint image, the information processing apparatus 100 terminates the processing in FIG. 6. The output virtual viewpoint image is displayed on the display unit 801 of the terminal device 105 that displays the evaluation value. The evaluation value and the virtual viewpoint image may be output to different output destinations.

On the other hand, in step S606, in a case where the instruction information obtained by the determination unit 110 indicates a setting of a new virtual viewpoint, the determination unit 110 determines not to generate the virtual viewpoint image (NO in step S606), and the processing returns to step S602. In steps S602 to S605, the information processing apparatus 100 obtains a new generation parameter based on a setting of the new virtual viewpoint and outputs the evaluation value. In a case where the evaluation value corresponding to the new generation parameter is accepted, the processing proceeds to step S607. In step S607, the image generation unit 112 generates the virtual viewpoint image based on the new generation parameter (the generation parameter newly set in response to the user operation after the evaluation value is first output) and outputs the generated virtual viewpoint image. As described above, the information processing apparatus 100 repeats obtainment of the instruction information and output of the evaluation value to eventually generate the virtual viewpoint image corresponding to the accepted evaluation value. Accordingly, the virtual viewpoint image corresponding to the user's request regarding the evaluation value can be provided. In step S606, in a case where the instruction information obtained by the determination unit 110 indicates cancellation of generation of the virtual viewpoint, the information processing apparatus 100 terminates the processing in FIG. 6.

In the above-described example, after the user completes the specifying operation related to generation of the virtual viewpoint image using the terminal device 105, the information processing apparatus 100 outputs the evaluation value corresponding to the specifying operation. However, the operation is not limited to the above-described one, and the information processing apparatus 100 may sequentially obtain the generation parameter during the specifying operation by the user using the terminal device 105, output the evaluation value at that time, and issue a notification to the terminal device 105 in a case where the evaluation value exceeds a threshold value. Further, the information processing apparatus 100 may perform control to output the virtual viewpoint image to the terminal device 105 in a case where the determined evaluation value is the threshold value or less and not to output the virtual viewpoint image to the terminal device 105 in a case where the determined evaluation value is more than the threshold value. On the other hand, the virtual viewpoint image may be output only in a case where the evaluation value is more than the threshold value.

A display form of the evaluation value on the terminal device 105 is not limited to the one illustrated in FIG. 8A. For example, a plurality of virtual viewpoint images corresponding to generation parameters in a plurality of patterns specified by the user and an evaluation value corresponding to each of the virtual viewpoint images may be displayed on the display unit 801 of the terminal device 105. Further, for example, the virtual viewpoint image corresponding to the generation parameter specified by the user, the virtual viewpoint image corresponding to another generation parameter automatically set based on the generation parameter, and the evaluation values corresponding to the respective virtual viewpoint images may be displayed. As described above, the plurality of virtual viewpoint images and the evaluation values thereof are displayed, and accordingly, for example, the user can select the virtual viewpoint image to be stored in the terminal device 105 based on the evaluation value.

As described above, the information processing apparatus 100 according to the present exemplary embodiment obtains the generation parameter related to generation of the virtual viewpoint image based on images that are obtained by imaging the imaging target area by the camera group 101 in a plurality of directions. Further, the information processing apparatus 100 determines the evaluation value of the virtual viewpoint image corresponding to the generation parameter based on the reference information that is stored in the information storage unit 104 in advance as information indicating a relationship between the generation parameter and the evaluation value and outputs the determined evaluation value. Using the above-described configuration, the image processing system 10 that provides the virtual viewpoint image can perform processing suitable for the virtual viewpoint image based on the evaluation value of the virtual viewpoint image as an object to be provided. For example, the virtual viewpoint image is handled differently corresponding to the evaluation value, so that an appropriate charge corresponding to content of the virtual viewpoint image can be charged to the user who requests generation of the virtual viewpoint image.

[Example of Determination Processing of Evaluation Value]

As described above, determination processing of the evaluation value in step S604 in FIG. 6 is not limited to the one that performs determination based on the reference information corresponding to the virtual viewpoint as illustrated in FIGS. 7A to 7C. Hereinafter, another example of the determination processing is described. For example, the determination unit 110 may determine the evaluation value based on the number of cameras in the camera group 101. More specifically, the determination unit 110 obtains an IP address of each of the cameras included in the camera group 101 from the image storage unit 103 to obtain the number of cameras. Further, the determination unit 110 determines the evaluation value by referring to the reference information about the number of cameras in the reference information stored in the information storage unit 104. For example, as the camera group 101 includes more cameras, the evaluation value of the virtual viewpoint image is determined as higher.

The determination unit 110 may determine the evaluation value based not on the number of cameras included in the camera group 101 but on the number of cameras actually used in generating the virtual viewpoint image. More specifically, if virtual viewpoints are set around the gaze point 302 in a case where a plurality of groups is included in the camera group 101 as illustrated in FIG. 3, the determination unit 110 obtains the number of cameras in the group 311 corresponding to the gaze point 302. Then, the determination unit 110 determines the evaluation value by referring to the number of cameras in the group 311 and the reference information. In a case where the virtual viewpoint is set so s to move from the vicinity of the gaze point 302 to the vicinity of the gaze point 301, the evaluation value may be determined based on a number obtained by adding the number of cameras in the group 311 corresponding to the gaze point 302 to the number of cameras in the group 310 corresponding to the gaze point 301.

Alternatively, the determination unit 110 may determine the evaluation value based not on the number of cameras but on the number of gaze points corresponding to a setting of the virtual viewpoint. More specifically, the determination unit 110 obtains, from the image storage unit 103, the IP address of each camera and information about the gaze point corresponding to each camera. Then, the determination unit 110 determines how many gaze points a camera needs to cover in order to generate the virtual viewpoint image corresponding to the set virtual viewpoint based on the information obtained from the image storage unit 103 and the viewpoint information indicating the virtual viewpoint. Based on the determination result, for example, the evaluation value of the virtual viewpoint image is determined to be higher in a case where the camera covering two gaze points is used compared to a case where the camera covering one gaze point is used. As described above, various methods can be considered for the determination processing of the evaluation value by the determination unit 110. In addition, the determination processing is not limited to the above-described examples.

[Example of Performing Determination Processing Based on Reference Information about Constraint]

In the above-described exemplary embodiment, the case has been described in which the information processing apparatus 100 determines the evaluation value of the virtual viewpoint image based on the reference information about the evaluation value stored in the information storage unit 104. For example, in a case where a price of the virtual viewpoint image is determined as the evaluation value, a form of service to provide the virtual viewpoint image can be achieved in which a user instructs generation of a virtual viewpoint image by operating the terminal device 105 and pays an output price to a system administrator. Alternatively, a form of service can also be considered in which the user pays a system usage charge to the administrator in advance, and a virtual viewpoint age corresponding to the paid charge is provided to the user. Hereinafter, a modification is described in which the image processing system 10 performs determination processing based on the reference information about a constraint to achieve the above described forms of service. However, how the image processing system 10 is used described below is not limited to the above-described forms of service.

In the present modification, the information storage unit 104 stores the reference information used for determining a constraint condition related to generation of the virtual viewpoint image in a storage medium such as a hard disk drive, a SSD, and a SD card. The reference information stored by the information storage unit 104 is input from the information processing apparatus 100 to the information storage unit 104 and is stored therein. However, the reference information may also be stored in a different way. The reference information stored by the information storage unit 104 may also be input from another apparatus to the information storage unit 104 or may be manually input by a user operating the operation unit of the information storage unit 104. The determination unit 110 obtains a generation parameter related to generation of the virtual viewpoint image as with the case of the above-described exemplary embodiment and determines whether the generation parameter satisfies the constraint condition indicated by the reference information obtained from the information storage unit 104. In a case where the constraint condition is satisfied, the determination unit 110 instructs the image generation unit 112 to generate and output the virtual viewpoint image. In other words, in the present modification, control of the virtual viewpoint based on the instruction information corresponding to the user operation is constrained by the constraint condition.

A processing flow of the information processing apparatus 100 according to the present modification is described with reference to FIG. 9. In FIG. 9, processing similar to that in FIG. 6 is denoted by the same reference numeral. In addition, a start timing of the processing illustrated in FIG. 9 is similar to that of the processing illustrated in FIG. 6.

In step S601, the image generation unit 112 obtains, from the image storage unit 103, the images based on the imaging of the imaging target area 201 in a plurality of directions by the camera group 101. In step S911, the determination unit 110 obtains user information from the terminal device 105. The user information obtained here includes at least identification information for identifying a user and attribute information indicating an attribute of the user. The identification information for identifying the user is, for example, a user identification (ID) registered in advance. However, content of the identification information for identifying the user is not limited to the above-described one and may also be identification information of the terminal device 105 such as an IP address or a cookie that is issued in a case where the user uses the image processing system 10. The attribute information indicating the attribute of the user is, for example, information indicating an authority of the user that is set in advance. However, content of the attribute information is not limited to the above-described one and may also include information indicating a rank of the user corresponding to a system use history by the user and an amount paid to the administrator, and information indicating affiliation and a job title of the user. The content of the user information is not limited to the above-described ones.

In step S602, the viewpoint setting unit 111 obtains, from the terminal device 105, the instruction information corresponding to specification of the generation parameter related to generation of the virtual viewpoint image. The instruction information includes the viewpoint information indicating the virtual viewpoint. The obtained instruction information is output to the determination unit 110 and is associated with the user information obtained in step S911 by the determination unit 110. An obtainment order among the obtainment of the image in step S601, the obtainment of the user information in step S911, and the obtainment of the viewpoint information in step S602 is not limited to the one illustrated in FIG. 9. In addition, at least two of the processing may be performed in parallel. Further, the information processing apparatus 100 does not have to separately obtain the user information and the viewpoint information, and can obtain the instruction information including the user information and the viewpoint information from the terminal device 105.

In step S603, the determination unit 110 obtains the generation parameter indicated by the instruction information output from the viewpoint setting unit 111. The generation parameter obtained by the determination unit 110 includes, for example, information indicating at least one of the position and the direction of the virtual viewpoint. However, the information included in the generation parameter is not limited to the above-described one and may also include information about an image quality, information indicating a method for specifying the virtual viewpoint, information about the imaging apparatus corresponding to an image used for generating the virtual viewpoint image, and information indicating a reproduction mode. The determination unit 110 may obtain the instruction information indicating the generation parameter directly from the terminal device 105 not via the viewpoint setting unit 111.

In step S912, the determination unit 110 determines whether the generation parameter obtained in step S603 satisfies the constraint condition. More specifically, the determination unit 110 determines whether the generation parameter indicated by the instruction information satisfies a constraint indicated by the reference information corresponding to the user information associated with the instruction information among the reference information stored in advance in the information storage unit 104. FIGS. 10A to 10C are tables illustrating examples of the reference information stored in the information storage unit 104. A case is described as an example in which it is determined whether the position and the direction of the virtual viewpoint as the generation parameters satisfy the constraint corresponding to a user attribute. The user attribute is determined, for example, based on a charge paid by the user to use the virtual viewpoint image. However, a method for determining the user attribute is not limited to the above-described one.

The reference information illustrated in FIG. 10A associates a height of the position of the virtual viewpoint with the attribute of a user who is allowed to set the virtual viewpoint at that height. In this case, for example, a user having an attribute C can set the virtual viewpoint at a height of less than 300 cm but is not allowed to set the virtual viewpoint at a height of 300 cm or more. More specifically, the reference information illustrated in FIG. 10A indicates a condition that the height of the virtual viewpoint is less than 300 cm as a constraint corresponding to the user having the attribute C. The reference information illustrated in FIG. 10B associates a distance between the position of the virtual viewpoint and a specific object such as a player with an attribute of a user who is allowed to set the virtual viewpoint. In this case, if the distance between the object and the virtual viewpoint is close, an amount of processing for drawing the object at high resolution increases, so that only a user in a high rank is allowed to set such a virtual viewpoint. The reference information illustrated in FIG. 10C associates an object included in a field of view of the virtual viewpoint (captured in the virtual viewpoint image) with an attribute of a user who is allowed to set the virtual viewpoint. In this case, depending on a setting of privacy of each person as an object, only a predetermined user is allowed to set the virtual viewpoint including the person in the field of view. The content and a format of the reference information are not limited to those illustrate in FIGS. 10A to 10C.

As described above, the reference information indicates the constraint on at least any one of an area in which the virtual viewpoint can be set, a distance between the virtual viewpoint and a specific object in the imaging target area 201, and an object included in the field of view of the virtual viewpoint. The content of the reference information stored in the information storage unit 104 is not limited to the above-described examples. For example, the reference information may indicate a constraint on at least any one of a moving distance of the virtual viewpoint, a moving speed of the virtual viewpoint, and a setting period of the virtual viewpoint. More specifically, in a case where a user is in a low rank, a moving distance of the virtual viewpoint may be allowed only to a predetermined value, movement of the virtual viewpoint may be only allowed at less than a predetermined speed, or generation of the virtual viewpoint image corresponding to a specific period may not be allowed.

In step S913, the determination unit 110 determines whether to generate the virtual viewpoint image based on the determination result of the constraint in step S912. If it is determined that the generation parameter indicated by the instruction information obtained from the terminal device 105 satisfies the constraint, the determination unit 110 determines to generate the virtual viewpoint image (YES in step S913). For example, if the user corresponding to the attribute C specifies the virtual viewpoint at a height of 250 cm in a case where the reference information illustrated in FIG. 10A is used, the determination unit 110 determines to generate the virtual viewpoint image corresponding to the virtual viewpoint. Then, in step S607, the image generation unit 112 generates the virtual viewpoint image corresponding to the generation parameter obtained in step S603 and outputs the generated virtual viewpoint image to the terminal device 105. Upon outputting the virtual viewpoint image, the information processing apparatus 100 terminates the processing in FIG. 9. The output virtual viewpoint image is displayed on the display unit 801 of the terminal device 105.

On the other hand, in step S912, if it is determined that the generation parameter indicated by the instruction information does not satisfy the constraint, the determination unit 110 determines not to perform generation and output of the virtual viewpoint image corresponding to the generation parameter (NO in step S913), and the processing returns to step S602. For example, if the user corresponding to the attribute C specifies the virtual viewpoint at a height of 350 cm in a case where the reference information illustrated in FIG. 10A is used, the determination unit 110 determines not to output the virtual viewpoint image corresponding to the virtual viewpoint. In this case, the determination unit 110 may output, to the terminal device 105, information indicating that the virtual viewpoint image corresponding to the instruction information cannot be output or information indicating which type of the generation parameter does not satisfy the constraint. The terminal device 105 may issue a notification based on the information received from the determination unit 110 to the user by image display and audio output.

FIG. 8B illustrates an example of an image displayed on the terminal device 105 in a case where the generation parameter does not satisfy the constraint. In this example, it is assumed that the virtual viewpoint included in the virtual camera path 802 specified by the user does not satisfy the constraint indicated in the reference information in FIG. 10B. In this case, error information 804 and an alternative camera path 805 are displayed on the display unit 801. The error information 804 includes information indicating that the generation parameter does not satisfy the constraint (display of "error") and information indicating a type of the generation parameter that does not satisfy the constraint (display of "virtual viewpoint"). The error information 804 further includes information indicating content of the constraint (display of "object distance"), i.e., the constraint on a distance between the virtual viewpoint and the object is not satisfied. The alternative camera path 805 is information indicating a movement path of the virtual viewpoint that satisfies the constraint and is automatically generated based on the virtual camera path 802 specified by the user. If an operation to specify the alternative camera path 805 is received from the user, the terminal device 105 outputs the instruction information including the generation parameter corresponding to the alternative camera path 805 to the information processing apparatus 100.

The display illustrated in FIG. 8B is an example of notification, and content of the notification is not limited to the illustrated one. For example, the plurality of alternative camera paths 805 may be displayed as candidates of the virtual viewpoint. Further, for example, in a case where a generation parameter regarding an image quality does not satisfy the constraint, the error information 804 may include information indicating the generation parameter and information indicating a value satisfying the constraint on the generation parameter. Alternatively, information simply indicating an error may be displayed as the error information 804.

When the processing returns from step S913 to step S602, in steps S602 to S912, the information processing apparatus 100 obtains new instruction information from the terminal device 105 and performs determination on the constraint condition. In a case where a new generation parameter indicated by the new instruction information satisfies the constraint, the processing proceeds to step S607. In step S607, the image generation unit 112 generates a virtual viewpoint image corresponding to the new generation parameter and outputs the generated virtual viewpoint image. In a case where the information processing apparatus 100 obtains, from the terminal device 105, the instruction information indicating cancellation of generation of the virtual viewpoint, the information processing apparatus 100 terminates the processing in FIG. 9.

In the above-described example, after the user completes the specifying operation related to generation of the virtual viewpoint image using the terminal device 105, the information processing apparatus 100 determines whether to output the virtual viewpoint image corresponding to the specifying operation. However, the operation is not limited to the above-described one. The information processing apparatus 100 may sequentially obtain the generation parameter during the specifying operation by the user using the terminal device 105, refer to the generation parameter and the reference information at the time, and perform control to output the virtual viewpoint image and notification to the terminal device 105.

In the above-described example, the image generation unit 112 does not generate the virtual viewpoint image as long as the generation parameter indicated by the instruction information corresponding to the user operation output from the terminal device 105 does not satisfy the constraint. However, the operation is not limited to the above-described one. The image generation unit 112 may generate the virtual viewpoint image even in a case where the constraint is not satisfied and may output the generated virtual viewpoint image in a case where the constraint is satisfied. In a case where the generation parameter indicated by the instruction information does not satisfy the constraint, the image generation unit 112 may generate an image in which an image indicating an error is superimposed on the virtual viewpoint image corresponding to the generation parameter and output the generated image. Further, in a case where the generation parameter indicated by the instruction information does not satisfy the constraint, the image generation unit 112 may output a virtual viewpoint image corresponding to a different generation parameter which satisfies the constraint.

For example, a case is considered in which the reference information illustrated in FIG. 10B is stored in the information storage unit 104, and a user having the attribute C performs an operation to locate a virtual viewpoint at a distance of 50 cm from an object. In this case, the constraint is not satisfied, so that the information processing apparatus 100 may output a virtual viewpoint image corresponding to a virtual viewpoint positioned at a distance of 100 cm from the object. Further, in this case, the information processing apparatus 100 may output a virtual viewpoint image corresponding to a virtual viewpoint positioned at a distance of 50 cm from the object with an image quality lower than usual. The information processing apparatus 100 outputs the virtual viewpoint image as an alternative to the virtual viewpoint image corresponding to the specifying operation by the user as described above, and accordingly a possibility that the virtual viewpoint image being watched by the user is suddenly interrupted can be reduced. In addition, if the alternative virtual viewpoint image meets a user's demand, the user can save time and effort to newly specify a generation parameter satisfying the constraint.

The information processing apparatus 100 may also determine whether to perform control to output the virtual viewpoint image corresponding to the reference information depending on a state of the image processing system 10. For example, the information processing apparatus 100 may output the virtual viewpoint image corresponding to the instruction information obtained from the terminal device 105 without determining the constraint condition in a case where processing loads on the apparatus and a communication path are smaller than threshold values. In a case where the processing loads on at least one of the apparatus and the communication path is greater than the threshold value, the information processing apparatus 100 may output the virtual viewpoint image corresponding to the instruction information only in a case where the instruction information obtained from the terminal device 105 satisfies the constraint. Accordingly, the image processing system 10 can provide the virtual viewpoint image to as many users as possible within a limited range of a system resource.

As described above, the information processing apparatus 100 according to the present modification obtains the instruction information that corresponds to specification of the generation parameter related to generation of the virtual viewpoint image and is associated with the user information. The information processing apparatus 100 determines whether the generation parameter indicated by the instruction information satisfies the constraint corresponding to the user information associated with the instruction information. The information processing apparatus 100 outputs the virtual viewpoint image corresponding to the generation parameter in a case where it is determined that the generation parameter satisfies the constraint. With the above-described configuration, the image processing system 10 that provides the virtual viewpoint image can perform processing suitable for the user who is provided with the virtual viewpoint image based on the constraint. A processing capability of the system can be appropriately used by dealing with the users differently in such a manner that, for example, a predetermined user in a high rank is preferentially provided with the virtual viewpoint image and a user in a low rank is not provided with the virtual viewpoint image that requires a large processing amount related to generation.

According to the above-described exemplary embodiments, a system that provides the virtual viewpoint image can perform processing suitable for a user who is provided with the virtual viewpoint image, the virtual viewpoint image as an object to be provided, or both.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-149435, filed Aug. 8, 2018, which is hereby incorporated by reference herein in its entirety.

What is claimed is:

1. An information processing apparatus comprising:
one or more memories storing instructions; and
one or more processors executing the instructions to:
obtain viewpoint information for specifying a virtual viewpoint designated by a user;
determine, based on the virtual viewpoint specified based on the obtained viewpoint information, a value of a virtual viewpoint image which corresponds to the virtual viewpoint designated by the user and which is to be generated based on a plurality of images obtained by a plurality of image capturing apparatuses capturing an imaging target area in a plurality of directions; and
output value information for specifying the determined value of the virtual viewpoint image to a display device which displays the value of the virtual viewpoint image corresponding to the virtual viewpoint designated by the user before the virtual viewpoint image corresponding to the virtual viewpoint designated is displayed.

2. The information processing apparatus according to claim 1, wherein the value is at least one of a charge and a point for using the virtual viewpoint image.

3. The information processing apparatus according to claim 1, wherein the value is determined based on at least any one of a moving distance of the virtual viewpoint, a moving speed of the virtual viewpoint, and a setting period of the virtual viewpoint.

4. The information processing apparatus according to claim 1, wherein the value is determined based on at least any one of a period of time during which the virtual viewpoint is positioned within a predetermined area, a distance between the virtual viewpoint and a specific object included in the imaging target area, and an object included in a field of view of the virtual viewpoint.

5. The information processing apparatus according to claim 1, wherein the value information for specifying the determined value of the virtual viewpoint image is output to the display device on which the virtual viewpoint image corresponding to the virtual viewpoint designated by the user is to be displayed.

6. The information processing apparatus according to claim 1, wherein the one or more processors further execute the instructions to generate a virtual viewpoint image based on viewpoint information that is newly set corresponding to a user operation after the value is output.

7. The information processing apparatus according to claim 1, wherein the value is determined using at least any one of array information that associates a parameter related to a virtual viewpoint with the value and a calculation formula for calculating the value from the parameter related to the virtual viewpoint.

8. An information processing apparatus comprising:
one or more memories storing instructions; and
one or more processors executing the instructions to:
obtain viewpoint information for specifying a virtual viewpoint designated by a user;
obtain user information for specifying the user designating the virtual viewpoint;
determine whether the virtual viewpoint specified based on the obtained viewpoint information satisfies a condition determined based on the obtained user information; and
output, based on a determination that the virtual viewpoint specified based on the obtained viewpoint information satisfies the condition, a virtual viewpoint image which corresponds to the virtual viewpoint designated by the user and which is to be generated based on a plurality of images obtained by a plurality of image capturing apparatuses capturing an imaging target area in a plurality of directions,
wherein the virtual viewpoint image corresponding to the virtual viewpoint designated by the user is not output based on a determination that the virtual viewpoint specified based on the obtained viewpoint information does not satisfy the condition.

9. The information processing apparatus according to claim 8, wherein the condition is a condition regarding at least any one of a moving distance of the virtual viewpoint, a moving speed of the virtual viewpoint, and a setting period of the virtual viewpoint.

10. The information processing apparatus according to claim 8, wherein the condition is a condition regarding at least any one of an area in which the virtual viewpoint can be set, a distance between the virtual viewpoint and a specific object included in the imaging target area, and an object included in a field of view of the virtual viewpoint.

11. The information processing apparatus according to claim 8, wherein a virtual viewpoint image corresponding to another virtual viewpoint that satisfies the condition is output based on the determination that the virtual viewpoint specified based on the obtained viewpoint information does not satisfy the condition.

12. The information processing apparatus according to claim 8, wherein the user information includes at least any one of identification information about the user and attribute information indicating an attribute of the user.

13. The information processing apparatus according to claim 8, wherein the condition is determined based on a charge, which is paid to use the virtual viewpoint image, corresponding to the user information.

14. A method for processing information, the method comprising:
obtaining viewpoint information for specifying a virtual viewpoint designated by a user;
determining, based on the virtual viewpoint specified based on the obtained viewpoint information, a value of a virtual viewpoint image which corresponds to the virtual viewpoint designated by the user and which is to be generated based on a plurality of images obtained by a plurality of image capturing apparatuses capturing an imaging target area in a plurality of directions; and
outputting value information for specifying the determined value of the virtual viewpoint image to a display device which displays the value of the virtual viewpoint image corresponding to the virtual viewpoint designated by the user before the virtual viewpoint image corresponding to the virtual viewpoint designated is displayed.

15. The method according to claim 14, wherein the value to be output in the outputting is at least one of a charge and a point for using the virtual viewpoint image.

16. A method for processing information, the method comprising:
obtaining viewpoint information for specifying a virtual viewpoint designated by a user;
obtaining user information for specifying the user designating the virtual viewpoint;
determining whether the virtual viewpoint specified based on the obtained viewpoint information satisfies a condition determined based on the obtained user information; and
outputting, based on a determination that the virtual viewpoint specified based on the obtained viewpoint information satisfies the condition, a virtual viewpoint image which corresponds to the virtual viewpoint designated by the user and which is to be generated based on a plurality of images obtained by a plurality of image capturing apparatuses capturing an imaging target area in a plurality of directions,
wherein the virtual viewpoint image corresponding to the virtual viewpoint designated by the user is not output based on a determination that the virtual viewpoint specified based on the obtained viewpoint information does not satisfy the condition.

17. The method according to claim 16, wherein the condition is determined based on a charge, which is paid to use the virtual viewpoint image, corresponding to the user information.

18. A non-transitory computer-readable storage medium storing a program for causing a computer to execute a method for processing information, the method comprising:
obtaining viewpoint information for specifying a virtual viewpoint designated by a user;
obtaining user information for specifying the user designating the virtual viewpoint;
determining whether the virtual viewpoint specified based on the obtained viewpoint information satisfies a condition determined based on the obtained user information; and
outputting, based on a determination that the virtual viewpoint specified based on the obtained viewpoint information satisfies the condition, a virtual viewpoint image which corresponds to the virtual viewpoint designated by the user and which is to be generated based on a plurality of images obtained by a plurality of image capturing apparatuses capturing an imaging target area in a plurality of directions,
wherein the virtual viewpoint image corresponding to the virtual viewpoint designated by the user is not output based on a determination that the virtual viewpoint specified based on the obtained viewpoint information does not satisfy the condition.

19. A non-transitory computer-readable storage medium storing a program for causing a computer to execute a method for processing information, the method comprising:
obtaining viewpoint information for specifying a virtual viewpoint designated by a user;
determining, based on the virtual viewpoint specified based on the obtained viewpoint information, a value of a virtual viewpoint image which corresponds to the virtual viewpoint designated by the user and which is to be generated based on a plurality of images obtained by a plurality of image capturing apparatuses capturing an imaging target area in a plurality of directions; and outputting value information for specifying the determined value of the virtual viewpoint image to a display device which displays the value of the virtual viewpoint image corresponding to the virtual viewpoint designated by the user before the virtual viewpoint image corresponding to the virtual viewpoint designated is displayed.

* * * * *